Nov. 2, 1926.  
A. A. SERVA  
1,605,856  
FABRIC CLEANING APPARATUS  
Filed Sept. 23, 1922   3 Sheets-Sheet 3
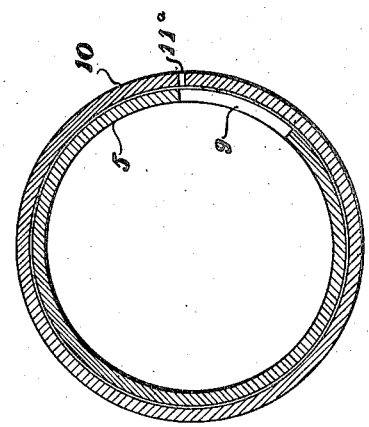
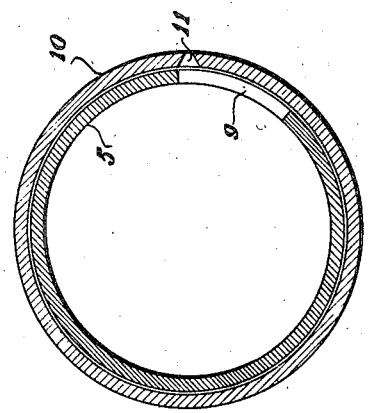
Inventor  
A.A.Serva  
By Frean and Bond  
Attorneys Patented Nov. 2, 1926.

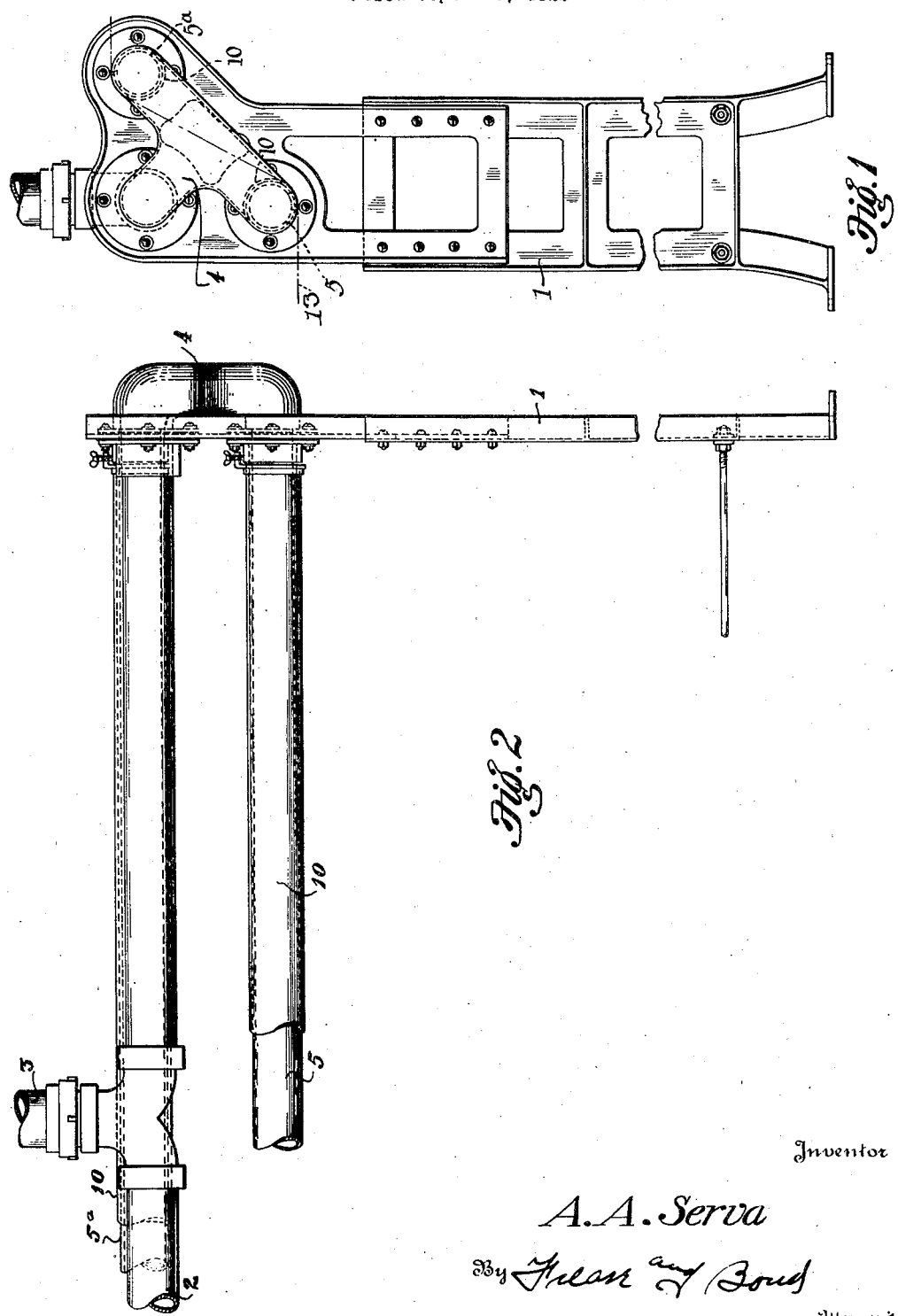

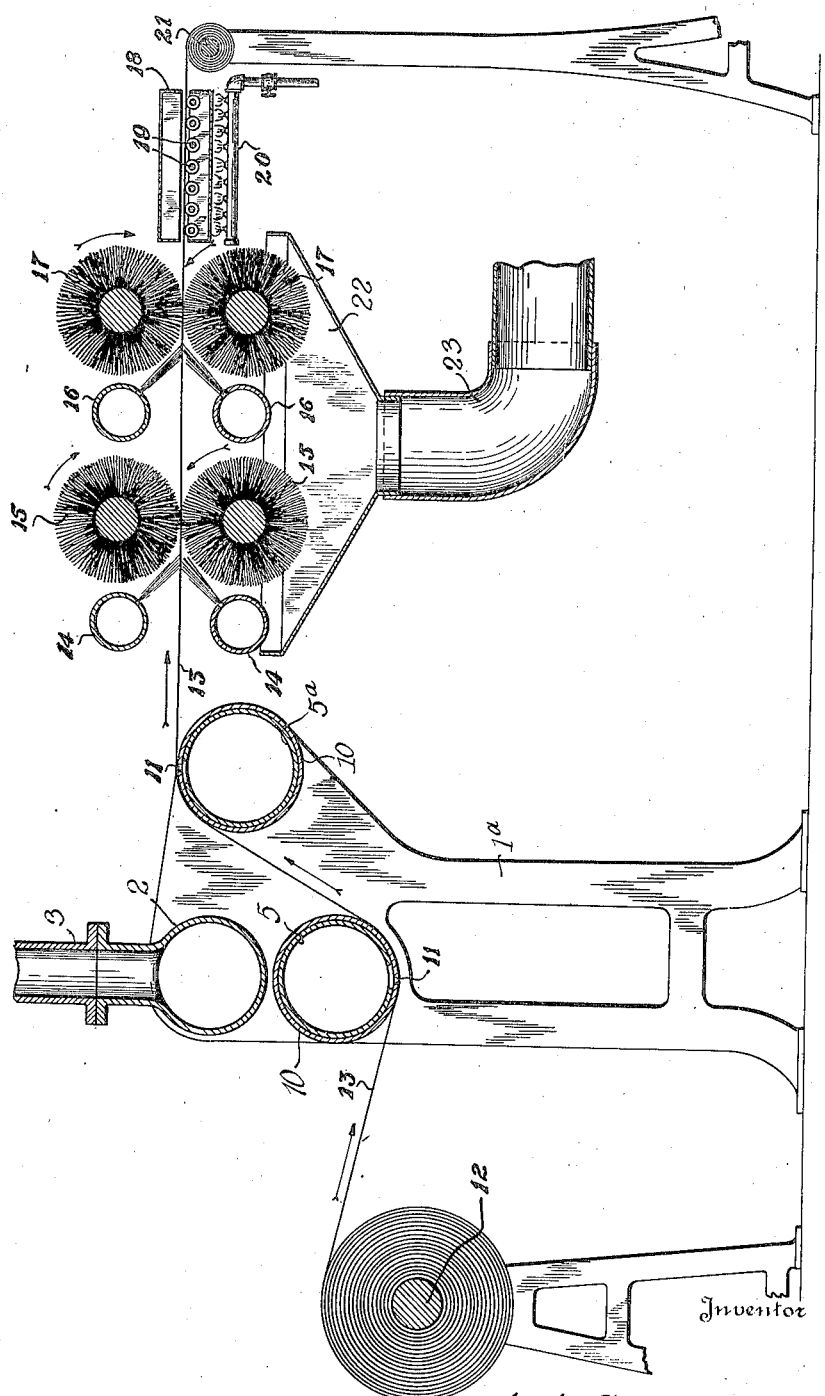

1,605,856

UNITED STATES PATENT OFFICE.

ADAM A. SERVA, OF CANTON, OHIO, ASSIGNOR TO THE UNITED ELECTRIC COMPANY, OF CANTON, OHIO, A CORPORATION OF OHIO.

FABRIC-CLEANING APPARATUS.

Application filed September 23, 1922. Serial No. 590,114.

The invention relates to an apparatus for cleaning strips or long sheets of fabric by suction or vacuum and for suction cleaning, scouring and drying fabric, carpet, rugs or the like.

The objects of the invention are to provide an apparatus for suction or vacuum cleaning of strips or sheets of fabric, carpets or rugs of various widths, for scouring and rinsing the fabric or carpet after the dust and dirt have been removed by vacuum and for drying the same as it passes from the scouring and rinsing mechanism; the vacuum cleaning, scouring, rinsing and drying being accomplished in a single continuous operation.

In the manufacture of rubber tires, a lamina of rubber composition, commonly called "friction", containing more or less sulphur, is cured by enveloping and compressing between the plies of a closely woven fabric, as of canvas or the like, rolled into a spiral pack; and, as a result of this curing process, a considerable amount of sulphur is secreted from the composition and is taken up by the canvas, wherein it adheres and dries in the form of a sulphurous dust which must be removed from the fabric before the same can be efficiently used for a repetition of the curing process. The sulphurous powder adheres quite tenaciously in the pores or meshes of the fabric, and it is practically impossible to completely remove it by ordinary means.

The present invention has been devised more particularly for the purpose of cleaning or removing the sulphurous dust adhering to the canvas as a result of such rubber curing process, and is an improvement over United States Letters Patent No. 1,291,440 to Charles A. Dillon, dated January 14, 1919; but it is not intended to limit the scope of the invention to such particular use, for it is evident that the improved apparatus can as well be used for cleaning any kind of separable dust or dirt from any kind of cloth or fabric, as, for instance, cotton, woolen, silken or other cloths, felts, carpets, rugs and the like, the scouring and drying apparatus being more especially adapted to such latter uses.

The above and other objects may be attained by passing the fabric or carpet, preferably from one roll to another, around opposite sides of a pair of transverse tubes having longitudinal suction slots in their contact sides, means being provided for adjusting the length of each suction slot to accommodate fabrics or carpet of various widths, whereby the suction of the two slots not only draws all separable dust from opposite sides of the fabric, but deflects the fabric into the slots, thus stretching it on one side and compressing it on the other side and loosening the dust therein, thereby thoroughly and completely cleaning the fabric from all separable dust.

For the purpose of cleaning carpet, rugs and the like, the same are passed through a scouring and rinsing apparatus after they pass over the suction cleaning device, water containing a cleaning compound being sprayed upon both sides of the carpet which then passes between a pair of brushes rotating in a direction opposite to the movement of the carpet, scouring both surfaces of the carpet which is then rinsed by jets of clear water and a second pair of rotary brushes, the carpet being finally passed through a drier, when it may be wound upon a roll.

A simple embodiment of the invention thus set forth in general terms is illustrated in the accompanying drawings, forming part hereof, in which—

Figure 1 is an end elevation of the suction cleaning mechanism;

Fig. 2, a side elevation of the same;

Fig. 3, a sectional view of the entire apparatus;

Fig. 4, a side elevation of one of the outer slotted vacuum tubes;

Fig. 5, a similar view of the corresponding inner tube;

Fig. 6, a transverse section through the tubes; and

Fig. 7, a similar section of a slightly modified form of vacuum tubes.

Similar numerals refer to similar parts throughout the drawings.

Side frames 1 and 1ª are provided, a suction pipe 2 being supported between said frames and connected as at its center, by a pipe 3 to a fan chamber or other suitable source of suction. Opposite ends of the pipe 2 are connected to manifolds 4, each of which connects to the adjacent ends of a pair of suction tubes 5 and 5ª, which may be rigidly mounted between the side frames 1 and 1ª, only one end of the pipe, and the corresponding manifold, being illustrated.

Each of these tubes is provided with a series of alined slots, indicated at 6, 7, 8 and 9, increasing in width from one end of the tube to the other, as best shown in Fig. 5, one side edge of each slot being alined with the other slot. A tube 10 is rotatably mounted upon each of the tubes 5 and 5ª, and is provided with a longitudinal, narrow series of alined slots, as shown at 11 of a width substantially equal to the narrow slot 6 in the tubes 5 and 5ª.

The slots 11 are preferably narrow at the outer surface of the tube 10 and wide at the inner surface thereof, as best shown in Fig. 6, for the purpose of producing a strong suction at the lips of the slot and for reducing friction upon the interior of the slot. If desired, these slots may be of the construction shown at 11ª in Fig. 7, the side walls thereof being parallel. For the purpose of adjusting the device to operate upon strips of fabric of various widths the tube 10 is turned upon the inner tube 5 or 5ª to a position to cut off the desired number of slots in the inner tube.

A roll or spindle 12 is preferably provided at one side of and parallel with the suction tubes, the fabric to be cleaned, indicated at 13, being wound upon the spindle, the free end of the fabric being carried forward under the rearward tube and thence upward and over the forward tube in such position that the fabric will extend across and cover the slots 11 when passed around the tubes.

After the fabric or carpet is passed over the tubes, it is carried forward in a substantially horizontal direction between a pair of spray nozzles 14 located upon opposite sides of the fabric and arranged to spray water containing a cleaning compound upon both faces of the fabric.

A pair of brushes 15 are mounted, one upon each side of the fabric just beyond the spray nozzles 14 and are rotated by any suitable means in a direction opposite to the movement of the fabric for the purpose of scouring both surfaces of the same after the cleaning compound has been placed thereon.

A second pair of spray nozzles 16 similar to the nozzles 14 are provided beyond the brushes 15 for the purpose of spraying clear water upon opposite sides of the fabric. In order to rinse the same a second pair of rotary brushes 17, similar to the brushes 15, are mounted beyond the spray nozzle 16 for the purpose of removing the suds from both sides of the fabric.

The fabric is then passed through an oven or drier 18, rollers 19 being preferably mounted in the lower portion thereof to support the fabric and a gas burner 20 or other suitable heating means being provided for heating the drier, the fabric as it emerges from the drier being preferably wound upon the spindle shown at 21.

The water and cleaning compound may be conveyed away from the machine through the hopper 22 which surrounds the spray nozzles and brushes and which communicates with a drain pipe 23.

In the operation of the apparatus, the fabric or carpet is drawn from the rear spindle 12 by a rotation of the forward spindle 21, and, in so doing, passes around the suction tubes and across the suction slots therein, and a strong suction is created in the tubes which forcefully draws the air inward through the slots and necessarily through the portion of the fabric which extends across the slots, sucking into the tube all free dust there may be in the fabric.

As the fabric passes through the scouring and rinsing mechanism above described, any dirt which may be ground into the fabric, will be scoured out and the suds will be rinsed from both sides of the fabric, which is then passed through the drier and wound upon the spindle 21 in a cleaned and dry condition.

I claim:

A fabric cleaning apparatus including a suction tube having a series of aligned longitudinal slots therein, the slots increasing in width from one end of the tube to the other, a second tube rotatably mounted thereon and provided with a plurality of aligned narrow longitudinal slots, and means for passing fabric over the slots in the outer tube, in contact with the lips thereof.

ADAM A. SERVA.